United States Patent
Hori

(10) Patent No.: US 7,699,901 B2
(45) Date of Patent: Apr. 20, 2010

(54) ALUMINA-FILM-POLISHING COMPOSITION AND CHEMICAL MECHANICAL POLISHING METHOD USING THE SAME

(75) Inventor: Tetsuji Hori, Tokyo (JP)

(73) Assignee: TDK Corporation, Tokyo (JP)

( * ) Notice: Subject to any disclaimer, the term of this patent is extended or adjusted under 35 U.S.C. 154(b) by 10 days.

(21) Appl. No.: 12/081,658

(22) Filed: Apr. 18, 2008

(65) Prior Publication Data

US 2008/0293330 A1 Nov. 27, 2008

(30) Foreign Application Priority Data

May 23, 2007 (JP) .............................. 2007-136414

(51) Int. Cl.
 *B24D 3/02* (2006.01)
 *H01L 21/302* (2006.01)
 *C03C 15/00* (2006.01)
(52) U.S. Cl. ........................ 51/307; 51/309; 438/691; 438/692; 438/693; 216/102
(58) Field of Classification Search ............... 51/307, 51/309; 438/691–694; 216/102
 See application file for complete search history.

(56) References Cited

U.S. PATENT DOCUMENTS

| 7,163,448 | B2 | 1/2007 | Hattori et al. |
| 2005/0090104 | A1* | 4/2005 | Yang et al. .................. 438/689 |
| 2005/0215060 | A1* | 9/2005 | Oh et al. ..................... 438/692 |
| 2008/0148649 | A1* | 6/2008 | Liu ............................ 51/298 |

FOREIGN PATENT DOCUMENTS

| JP | A-09-143455 | 6/1997 |
| JP | A-2003-347248 | 12/2003 |
| JP | A-2004-349426 | 12/2004 |
| JP | A-2006-516067 | 6/2006 |
| JP | A-2006-302968 | 11/2006 |
| WO | WO 2004/044076 A1 | 5/2004 |

\* cited by examiner

*Primary Examiner*—Jerry Lorengo
*Assistant Examiner*—Shuangyi Abu Ali
(74) *Attorney, Agent, or Firm*—Oliff & Berridge, PLC

(57) ABSTRACT

An alumina-film-polishing composition is for use in chemical mechanical polishing of an object to be polished that includes an alumina film with an irregular surface, so as to planarize the irregular surface. The polishing composition contains an alumina abrasive grain, and a protection-film-forming agent for forming a protection film on the surface of each of the alumina film and the alumina abrasive grain. The protection-film-forming agent is a water-soluble polymer that has a weight average molecular weight within a range of 100 to 1,000,000 and that is obtained by polymerizing a monomer having at least one OH group or COOH group in its molecule.

3 Claims, 3 Drawing Sheets

ALUMINA-FILM-POLISHING COMPOSITION AND CHEMICAL MECHANICAL POLISHING METHOD USING THE SAME

BACKGROUND OF THE INVENTION

1. Field of the Invention

The present invention relates to an alumina-film-polishing composition and a chemical mechanical polishing method using the same. The composition and the method of the present invention are employable in the planarization process to form an insulating layer of a magnetic head device for use in a magnetic recording apparatus.

2. Description of the Related Art

A magnetic head device for use in a magnetic recording apparatus is manufactured by forming a plurality of elements, each including a magnetic reading section and a magnetic writing section, on an alumina-titanium carbide ceramic substrate (hereinafter referred to as "AlTiC wafer"), and subsequently cutting the substrate into the individual elements. The basic structure of the elements is formed through various wafer processes performed on the AlTiC wafer, as is the case with a semiconductor device using a silicon wafer. One of such processes is chemical mechanical polishing (hereinafter referred to as "CMP"). In the CMP process, an object to be polished is brought into contact with a polishing pad with a down force while the object is rotated relative to the polishing pad, so that an irregular surface of the object is planarized. A polishing composition (polishing slurry) containing an abrasive grain and a polishing accelerator is used in the CMP process.

In a magnetic head device, unlike a semiconductor device, alumina ($Al_2O_3$) is used for most insulating layers. For this reason, polishing slurries for use in a CMP process in manufacturing a semiconductor device, which are typically intended for polishing silicon, cannot be used for such insulating layers. A polishing slurry most commonly used in the CMP process in manufacturing a magnetic head device has a composition containing an alumina abrasive grain with a cation or anion added thereto, the cation or anion having a capability of dissolving alumina, which is the object to be polished, to some extent.

In forming an element having a multilayer structure, an insulating film is formed between a lower layer and an upper layer. One of major purposes of the CMP process is to eliminate steps (differences in level) on the surface of the insulating film resulting from irregularities of the lower layer, and to thereby prevent a deviation of the exposure focus when patterning the upper layer. In the CMP process, a difference in removal rate between higher (projecting) areas and lower (recessed) areas of the surface is utilized for reducing the step heights. The step heights are more efficiently reduced as the difference in removal rate is greater. As the step heights are reduced to some extent, however, the difference in polishing down force between the higher areas and lower areas becomes small, so that the lower areas, which need not undergo removal, highly tend to undergo removal together with the higher areas. To completely planarize the irregularities, a stock removal nearly twice the initial step height is therefore required. Typically, as the stock removal increases, the "stock removal variation" increases accordingly. The "stock removal variation" means variations in stock removal in a wafer surface polished, and is expressed as a difference between the maximum stock removal and the minimum stock removal in the wafer surface. This term is used in the same sense throughout the following description. Polishing a surface can cause a certain stock removal variation, due to the act of polishing, even when a wafer with a completely flat surface is polished, and can result in higher (projecting) areas and lower (recessed) areas in the surface. It is therefore extremely important to reduce the stock removal variation in manufacturing products. Unfortunately, however, increasing the stock removal in order to eliminate the initial step height inevitably increases the stock removal variation.

One approach to solve this problem is to form a polishing stopper layer, made of a material resistant to removal by polishing, on the lower (recessed) areas before polishing is performed. For example, JP 2004-349426A discloses a technique of using a polishing slurry that can provide a high removal selectivity ratio between the polishing stopper layer and a layer to be polished. This technique is considerably effective, but disadvantageously involves an increased number of process steps. In addition, since this technique is intended for a process to polish a silicon dioxide film, it is questionable whether this technique is applicable to a process to polish an alumina film. This is because the polishing slurry disclosed in JP 2004-349426A, which has a satisfactory removal selectivity ratio for a silicon dioxide film, will not necessarily exhibit a practical removal rate for an alumina film.

To solve the above-mentioned problem, furthermore, an attempt has been made to change the polishing process itself. A typical polishing process is performed on an elastic polishing pad. Consequently, a deformation of the polishing pad causes transfer of some polishing down force to lower (recessed) areas, as well as higher (projecting) areas, of the surface being polished. To cope with this, various techniques have been proposed, including a technique of employing a polishing pad harder than a conventional one, and a technique of employing a polishing process with a lower polishing down force and an increased linear velocity in order to minimize the deformation of the pad. While these techniques may be effective to some extent, they cannot be a fundamental solution because each of them relies on the same principle of polishing. Rather, these techniques may lead to an increase in stock removal variation in the wafer surface.

JP 2006-516067A discloses the use of a polishing composition that contains a water-soluble polymer compound for the purpose of reducing the occurrence of scratches during the CMP process. However, this composition is also intended to be used for polishing a semiconductor substrate, and therefore cannot be directly applied to polishing of an alumina film. In addition, in this publication no attention is drawn to reducing the total stock removal required for complete planarization.

OBJECT AND SUMMARY OF THE INVENTION

As described above, a CMP process using a conventional polishing slurry has problems that are inherent in the principle of polishing. The present invention is to solve those problems. Specifically, it is an object of the present invention to eliminate differences in level on the surface of an alumina film efficiently with a minimum stock removal, without increasing the number of the process steps as compared with a conventional CMP process.

An alumina-film-polishing composition of the present invention is for use in chemical mechanical polishing of an object to be polished, the object including an alumina film with an irregular surface, for planarizing the irregular surface.

The alumina-film-polishing composition of the present invention contains an alumina abrasive grain, and a protection-film-forming agent for forming a protection film on the surface of each of the alumina film and the alumina abrasive grain. The protection-film-forming agent is a water-soluble polymer that has a weight average molecular weight within a range of 100 to 1,000,000 and that is obtained by polymerizing a monomer having at least one OH group or COOH group in its molecule.

In the alumina-film-polishing composition of the present invention, the alumina abrasive grain content may be within a range of 0.1 to 30 wt %, and the water-soluble polymer content may be 0.001 to 1 wt %.

In the alumina-film-polishing composition of the present invention, the water-soluble polymer is preferably polyvinyl alcohol or polyethylene glycol dimethyl ether.

In the alumina-film-polishing composition of the present invention, the alumina film may be one used as an insulating film of a magnetic head device in a magnetic recording apparatus.

A concentrated alumina-film-polishing composition of the present invention contains less water compared with the above-described alumina-film-polishing composition in actual use, and is to be diluted by adding water to form the above-described alumina-film-polishing composition.

A chemical mechanical polishing method of the present invention is a method for polishing an object to be polished, the object including an alumina film with an irregular surface, in the presence of a polishing slurry to thereby planarize the irregular surface. In this method, the alumina-film-polishing composition described above is used as the polishing slurry.

Containing the protection-film-forming agent, the alumina-film-polishing composition of the present invention can eliminate differences in level on the surface to be polished, with a minimum stock removal and without increasing the number of steps of the CMP process in which this composition is used. Thus, by using the alumina-film-polishing composition of the present invention, it is possible to planarize the surface of an alumina film efficiently while reducing the stock removal variation, which is an important factor in manufacturing products.

The chemical mechanical polishing method of the present invention uses, as the polishing slurry, the alumina-film-polishing composition containing the protection-film-forming agent. The method thus makes it possible to greatly reduce the stock removal required for complete planarization. As a result, it becomes possible to reduce the stock removal variation of an alumina film in a wafer surface, and to thereby improve the polishing performance.

Other and further objects, features and advantages of the invention will appear more fully from the following description.

DETAILED DESCRIPTION OF THE PREFERRED EMBODIMENT

Figure 1:
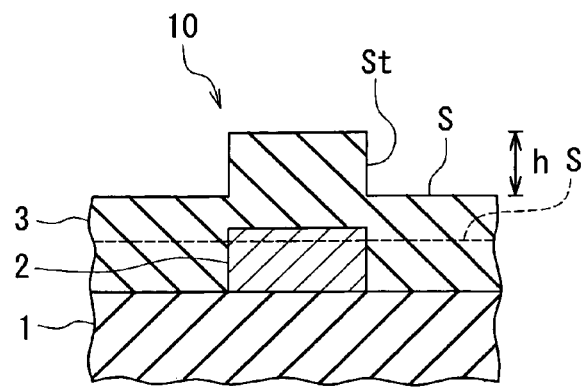
FIG. 1 is an illustrative diagram showing the configuration of a laminate to be polished by a chemical mechanical polishing method of an embodiment of the invention.

A preferred embodiment of the present invention will now be described.

An alumina-film-polishing composition of this embodiment is for use in chemical mechanical polishing of an object to be polished including an alumina film with an irregular surface, so as to planarize the irregular surface. The alumina-film-polishing composition contains, as an abrasive grain, at least an alumina abrasive grain, and further contains a protection-film-forming agent for forming a protection film on the surface of each of the alumina film and the alumina abrasive grain. The protection-film-forming agent is a water-soluble polymer that has a weight average molecular weight within a range of 100 to 1,000,000 and that is obtained by polymerizing a monomer having at least one OH group or COOH group in its molecule.

The abrasive grain to be used for the alumina-film-polishing composition of the present embodiment may be any abrasive grain including at least an alumina abrasive grain. The alumina abrasive grain may be grains of crystalline fumed alumina, amorphous colloidal alumina or the like. The alumina abrasive grain is preferably such one that the grain diameter determined from the specific surface area by a BET method is adjusted to approximately 10 to 1000 nm. If the abrasive grain diameter is less than 10 nm, the alumina abrasive grain cannot provide a satisfactory mechanical polishing force. On the other hand, if the abrasive grain diameter exceeds 1000 nm, the specific surface area decreases, so that the area of the alumina surface on which the protection film can be formed becomes relatively smaller. This hinders the alumina abrasive grain from satisfactorily performing its intended function, and may further lead to problems such as scratches on the surface polished and damage to the elements.

In the alumina-film-polishing composition of the present embodiment, the water-soluble polymer used as the protection-film-forming agent is preferably a polymer compound obtained by polymerizing a monomer having at least one highly polar functional group, such as an OH group, a COOH group or a COOR group (where R represents a lower alkyl group such as a methyl group), in its molecule. Examples of such a water-soluble polymer include polyvinyl alcohol and polyethylene glycol dimethyl ether.

In the alumina-film-polishing composition of the present embodiment, as the molecular weight of the water-soluble polymer used as the protection-film-forming agent is greater, the protection film formed by this agent is greater in strength. However, increasing the molecular weight of the water-soluble polymer leads to a problem such as a reduction in mechanical polishing force or imperfect cleaning after the CMP process. On the other hand, if the water-soluble polymer is relatively smaller in molecular weight, the solubility in water becomes relatively higher. This makes it easy to adjust the polishing composition and to design a concentrated composition, but decreases the strength of the protection film. Thus, the water-soluble polymer to be used in this composition preferably has a weight average molecular weight within a range of 100 to 1,000,000, and more preferably within a range of 300 to 100,000.

In addition to the above-described components, the alumina-film-polishing composition of the present embodiment can contain other components, including a polishing accelerator, water, an abrasive grain dispersion stabilizer, an antifoaming agent, and an antimicrobial agent.

The polishing accelerator for use in the alumina-film-polishing composition of the present embodiment is not specifically limited as long as it has a capability of dissolving alumina. Preferred examples of the polishing accelerator include inorganic acids such as nitric acid, hydrochloric acid, phosphoric acid and sulfuric acid, organic acids such as acetic acid, oxalic acid and citric acid, inorganic bases such as potassium hydroxide and sodium hydroxide, organic bases such as ammonia, methylamine and dimethylamine, and neutral compounds capable of forming chelates, such as glycine and alanine, and salts thereof. Since Al is an amphoteric metal, alumina exhibits solubility both in the acidic region and the basic region. While the manner in which alumina dissolves can vary more or less depending on the type of anions or cations coexisting with alumina, it can be estimated from a corresponding Pourbaix diagram. In the case of using a polishing accelerator, it should not be used in a region where alumina predominantly exists in its stable form in such a coexisting system. Specifically, this region is a neutral region. It should be noted, however, the intended functions of the polishing composition of the present embodiment will not be completely lost in the neutral region, since the polishing composition can exhibit a mechanical polishing effect even in the neutral region.

In the alumina-film-polishing composition of the present embodiment, the alumina abrasive grain content is preferably within a range of 0.1 to 30 wt %. If the alumina abrasive grain content is less than 0.1 wt %, the alumina abrasive grain cannot exhibit satisfactory polishing capability. If the alumina abrasive grain content is higher than 30 wt %, there arise problems such as an increase in manufacturing cost, a reduction in stability of the alumina-film-polishing composition, and a difficulty in designing a concentrated composition.

In the alumina-film-polishing composition of the present embodiment, the content of the water-soluble polymer as the protection-film-forming agent is preferably within a range of 0.001 to 1 wt %, although the content may vary depending on the molecular weight of the water-soluble polymer. If the water-soluble polymer content is less than 0.001 wt %, the function of forming a protection film cannot be satisfactorily performed. If the water-soluble polymer content is higher than 1 wt %, aggregation of the alumina abrasive grain can occur to thereby degrade the polishing performance. For example, the water-soluble polymer content is preferably within a range of 0.001 to 0.01 wt % when the weight average molecular weight of the water-soluble polymer is within a range of 20,000 to 30,000. The water-soluble polymer content is preferably within a range of 0.50 to 0.1 wt % when the weight average molecular weight of the water-soluble polymer is within a range of 200 to 300.

The alumina-film-polishing composition of the present embodiment can contain water. The water content is the remainder obtained by subtracting the sum of the contents of the alumina abrasive grain and the water-soluble polymer as essential components and the contents of the polishing accelerator and other components as optional components from 100 wt %. The present embodiment can also be provided as a concentrated alumina-film-polishing composition that contains less water compared with the alumina-film-polishing composition having the above-described formulation in actual use, and that is to be diluted by adding water to form the above-described alumina-film-polishing composition. In this case, the concentrations of the components other than water need to be set higher according to the intended dilution ratio. In order to ensure stability of the polishing composition, however, care must be taken not to make the concentrations of those components too high.

The alumina-film-polishing composition of the present embodiment can be prepared by mixing the above-described essential components and optional components at a predetermined ratio.

A chemical mechanical polishing method using the alumina-film-polishing composition of the present embodiment will now be described in detail with reference to the drawings. The chemical mechanical polishing method of the present embodiment is suitably used to form alumina insulating films in the process of manufacturing an element structure of a magnetic head device used in a magnetic recording apparatus. FIG. 1 is a cross-sectional view illustrating a portion of a laminate 10 to be polished by the chemical mechanical polishing method of the present embodiment. The laminate 10 includes an AlTiC wafer (not shown) serving as a substrate, an insulating film 1 of alumina formed on the AlTiC wafer, a magnetic metal material layer 2 formed into a predetermined pattern on the insulating film 1, and an alumina thin film 3 formed to cover the magnetic metal material layer 2. The alumina thin film 3 has a step St resulting from the magnetic metal material layer 2.

The magnetic metal material layer 2 is formed on the surface of the insulating film 1 using a material such as NiFe through a known technique such as lithography, sputtering, or plating. The magnetic metal material layer 2 can be formed in various forms, including those intended to serve as a magnetic shield, a magnetic writing pole and so on. In addition, for example, a coil made of a nonmagnetic metal material such as Cu may be formed in conjunction with the magnetic metal material layer 2, for generating a magnetic field. In the laminate 10, the alumina thin film 3 serving as an insulating film is formed so that it completely or partially covers the magnetic metal material layer 2. The alumina thin film 3 is typically deposited by sputtering because the magnetic material used to form the magnetic metal material layer 2 is susceptible to heat. If there is a sharp corner between the magnetic metal material layer 2 and the alumina thin film 3, however, cracking can occur. To prevent this, a thin underlying alumina layer can be formed in advance by low-temperature chemical vapor deposition, as necessary. The amount of deposition of the alumina thin film 3 varies depending on the stock removal required for reducing the height of the step on the surface resulting from the magnetic metal material layer 2 to a tolerable level in the CMP process to be performed later. In other words, the amount of deposition of the alumina thin film 3 can be smaller if better step height reducing performance is achieved in the polishing process. The minimum amount of deposition of the alumina thin film 3 is equivalent to the height "h" of the step St resulting from the magnetic metal material layer 2. In many cases, the alumina thin film 3 is deposited to a thickness two to three times as great as the initial height "h" of the step St.

In the chemical mechanical polishing method of the present embodiment, the laminate 10 is polished by CMP until the surface S of the alumina thin film 3 reaches the level indicated with the broken line in FIG. 1. In the chemical mechanical polishing method of the present embodiment, the alumina-film-polishing composition of the embodiment is used in the CMP process to polish the alumina thin film 3 and the magnetic metal material layer 2. The CMP process can be performed with a CMP apparatus having a known configuration. All the conditions for this CMP process, including the polishing down force and the linear velocity of the laminate 10 to be polished and the polishing pad, can follow typical CMP conditions, except that the alumina-film-polishing composition of the present embodiment is used as the polishing slurry.

While FIG. 1 illustrates that the level of the surface S after polishing is lower than that of the initial surface of the magnetic metal material layer 2, this level can vary depending on the purpose of the magnetic metal material layer 2. Since upper elements are formed by lithography on the surface S after the polishing, it is essential that the surface S be polished to such a planarity (flatness) that the lithography to form the upper elements can be performed without problems.

Figure 2:
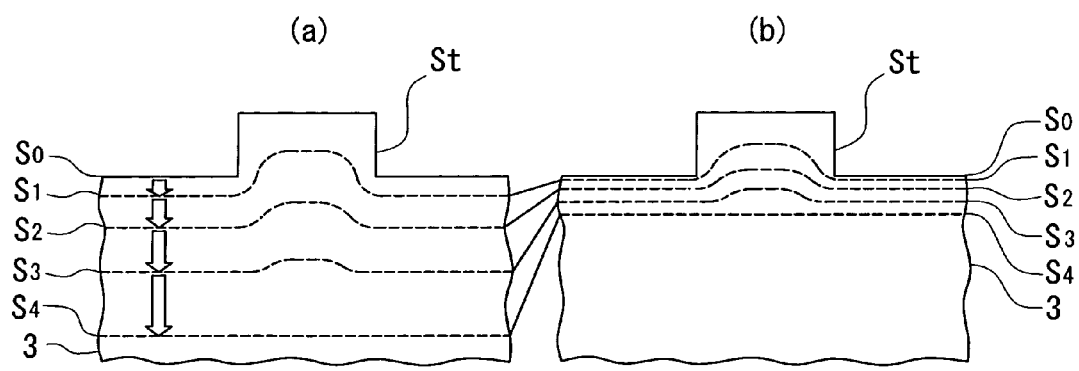
FIG. 2 is an illustrative diagram showing how planarization is achieved by different CMP processes, wherein the portion (a) shows the case of using a conventional polishing slurry, while the portion (b) shows the case of using a polishing composition of the present invention.

By using the alumina-film-polishing composition of the present embodiment in planarizing the alumina thin film 3 that has the initial step St as shown in FIG. 1, it is possible to achieve better step height reducing performance and to reduce the stock removal variation of the alumina thin film 3 in the wafer surface as compared with the case of using a conventional polishing slurry. This will now be described with reference to FIG. 2. FIG. 2 illustrates polishing processes by CMP for planarizing the alumina thin film 3 using the alumina-film-polishing composition of the present embodiment and using a conventional polishing slurry in comparison with each other. FIG. 2(a) shows the case of using the conventional polishing slurry, while FIG. 2(b) shows the case of using the alumina-film-polishing composition of the present embodiment. In each of FIG. 2(a) and FIG. 2(b) the broken lines drawn in the alumina thin film 3 shows changes of the surface being polished in the polishing process. $S_o$ indicates the initial surface having the initial step St before undergoing polishing. $S_4$ indicates the final surface planarized through polishing. Each of $S_1$, $S_2$ and $S_3$ indicates the surface at a given point during polishing. The comparison between FIG. 2(a) and FIG. 2(b) shows that the stock removal required for completely eliminating the initial step St to reach the planarized surface S4 is significantly greater in the case of using the conventional polishing slurry than in the case of using the alumina-film-polishing composition of the present embodiment. In other words, the use of the alumina-film-polishing composition of the present embodiment allows a significant reduction in stock removal required for complete planarization, compared with conventional art. How this advantage is achieved by the present invention is described below.

Figure 3:
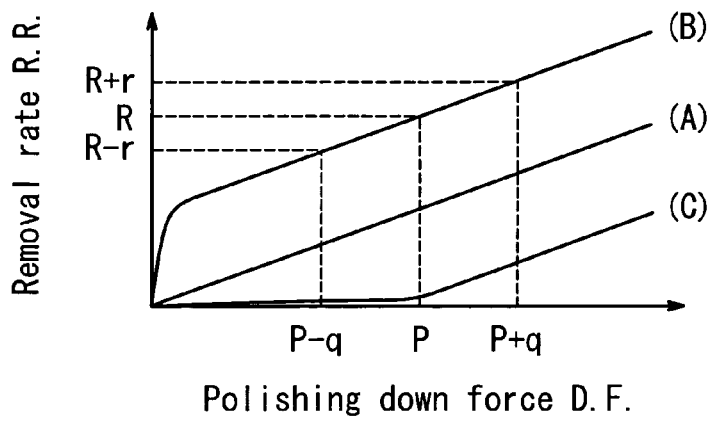
FIG. 3 is an illustrative diagram showing the relationship between the polishing down force and the removal rate in the CMP process.

FIG. 3 illustrates the relationship between the polishing down force and the removal rate in the CMP process. The fundamental mechanism of the CMP process follows the following Preston's equation (1):

$$R.R.=K \times D.F. \times L.V. \quad (1)$$

where R.R. represents removal rate, D.F. represents polishing down force, L.V. represents linear velocity, and K represents proportionality constant. The equation (1) means that R.R. is proportional to D.F. and L.V (straight line A in FIG. 3). Specifically, when an alumina surface having an initial step is polished on a polishing pad, a difference in removal rate is generated, in accordance with the equation (1), between a higher (projecting) area of the surface, on which a relatively high D.F. is exerted, and a lower (recessed) area of the surface, on which a relatively low D.F. is exerted. Planarization by CMP utilizes the phenomenon in which higher (projecting) areas selectively undergo removal due to this difference in removal rate.

To provide sufficiently high removal rate, a typical polishing slurry used in a CMP process contains an abrasive grain to accelerate mechanical polishing, and also a polishing accelerator that contains a cation or anion for the purpose of providing a chemical dissolving action. In this case, the above equation (1) does not directly apply and the line shape deforms into various shapes, of which the most common shape is one expressed by the following equation (2).

$$R.R.=K \times D.F. \times L.V. + \alpha \quad (2)$$

Although the equation (2) shows a proportional relationship similar to that of the equation (1), its line shape is such that a positive (+) intercept is formed on the axis of removal rate. What this positive intercept means is that the polishing slurry or composition exhibits some removal rate ($\alpha$) even when the polishing down force and the linear velocity are both zero. This removal rate ($\alpha$) is caused by the chemical dissolving action of the polishing accelerator. Typically, the chemical dissolving action during polishing is accelerated as the surface is rubbed against the polishing pad, so that the actual line shape is such that the removal rate rapidly becomes close to zero in a low polishing down force region (see the curve B of FIG. 3).

As described previously, the difference in removal rate between a higher (projecting) area and a lower (recessed) area is utilized for eliminating the initial step St in the CMP process. The greater the difference in removal rate therebetween, the better the step height reducing performance. However, even in the CMP process that follows the equation (2), the difference in polishing down force between the higher and lower areas becomes smaller as the step height is reduced to some extent, so that the lower area, which need not undergo removal, highly tends to undergo removal together with the higher area. For example, assuming that an irregular surface (a surface including a relatively higher area and a relatively lower area) is polished with a polishing down force P, a down force of P−q is exerted on the lower area while a down force of P+q is exerted on the higher area, as shown in FIG. 3. This causes a difference in removal rate between the higher area and the lower area (the removal rate at the lower area is R−r, while that at the higher area is R+r), and as a result, the initial step St is gradually reduced in height. Once the surface has been made planar, uniform polishing down force P is exerted on the entire surface and consequently uniform removal rate R is obtained over the entire surface. In the course of the planarization process, the step height reducing efficiency decreases as the initial step St is reduced in height. Therefore, as shown in FIG. 2(a), a stock removal nearly twice the height of the initial step St is required for completely removing the step to thereby make the surface completely planar. An increase in stock removal inevitably causes an increase in stock removal variation of the alumina thin film 3 in the AlTiC wafer surface. To suppress the stock removal variation, it is required to improve the step height reducing efficiency and to minimize the stock removal required for complete planarization.

To achieve high step height reducing efficiency, it is important to ensure a difference in polishing down force between the higher area and the lower area that form the initial step St. A conventional polishing slurry has two factors that can be a bar to providing a desired difference in polishing down force. The first factor is the presence of a polishing accelerator that has a capability of dissolving an object to be polished. Due to the capability of dissolving the object, the polishing accelerator acts to reduce the surface irregularities of the object and thereby reduces the down-force difference between the higher area and the lower area, thus resulting in a reduction in step height reducing efficiency. The second factor is that a conventional polishing slurry has low polishing performance in a high polishing down force region. Specifically, when polishing is performed with a high polishing down force, it is difficult for the polishing slurry to flow into the space between the surface of the object to be polished and the polishing pad, so that it is not possible to achieve a sufficient removal rate proportional to the polishing down force. Minimizing the effects of these two factors is therefore important for improving the step height reducing performance of CMP.

The present embodiment is intended to eliminate the above two factors and achieve desired removal selectivity by improving the composition of a polishing slurry. The water-soluble polymer contained in the alumina-film-polishing composition of the embodiment is one obtained by polymerizing a monomer that has in its molecule an electron-donating functional group, such as an OH group or COOH group, and therefore the polymer molecule itself includes an electron-donating structure resulting from the functional group. The polymer can therefore be electrically attracted to the alumina surface of the object to be polished and the abrasive grain used. The attracted polymer layer serves as a protection film on the surface of the alumina thin film 3 as the object to be polished and on the surface of the alumina abrasive grain to thereby weaken the chemical action of the polishing accelerator on the alumina surface. In the actual polishing process, the polymer layer also serves to weaken the mechanical polishing action of the abrasive grain on the object to be polished in a low polishing down force region, while it loses its function as the protecting film in a region of a certain down force or higher. Specifically, compared with a conventional case, the addition of the water-soluble polymer changes the downforce dependence of the removal rate to a form expressed by the following equation (3).

$$R.R.=K \times D.F. \times L.V. + \alpha - \beta \quad (3)$$

The equation (3) is a modification of the equation (2). In the equation (3), $\beta$ represents the action of the protection film of the present embodiment. When $\beta$ is sufficiently greater than $\alpha$, $\alpha-\beta$ is a negative value and the line shape expressed by the equation (3) is therefore a straight line having a negative (−) intercept on the axis of removal rate (in practice, however, the removal rate R.R. has such a line shape as to gradually approach zero like the curve C of FIG. 3). Specifically, in a CMP process that follows the equation (3), the removal rate R.R. is close to zero at a certain down force (e.g., D.F.=P) or lower. In principle, when polishing is performed with such a down force, removal proceeds only at higher areas where the down force is relatively high (e.g., D.F.=P+q), whereas lower areas where the down force is relatively low (e.g., D.F.=P−q) undergo hardly any removal or no removal at all. The magnitude of the action $\beta$ is determined by the molecular weight of the water-soluble polymer used and the number of the electron-donating structures in the water-soluble polymer resulting from the electron-donating functional groups in the monomer.

Furthermore, the use of a water-soluble polymer having a specific molecular weight as the protection-film-forming agent serves to increase the viscosity of the alumina-film-polishing composition itself. This prevents degradation in performance of the polishing composition in a high down force region. In other words, the polishing composition can readily flow into the space between the object to be polished and the polishing pad even in the high down force region.

For the above-described reasons, the use of the alumina-film-polishing composition of the present embodiment as the polishing slurry in a CMP process makes it possible to achieve step height reducing performance higher than that achieved by conventional art, without increasing the number of the process steps.

The present invention will now be further specifically described with reference to Examples and Comparative examples, which are not intended to limit the scope of the invention in any way.

Examples 1 through 4

For each of Examples 1 through 4, a polishing composition was prepared using polyvinyl alcohol (PVA) or polyethylene glycol dimethyl ether (PEGDE) as the water-soluble polymer, a commercially available undiluted polishing slurry solution, and water. The PVA used was polyvinyl alcohol #500 (molecular weight=22,000) manufactured by Kanto Chemical Co., Inc. The PEGDE used was polyethylene glycol dimethyl ether 250 for synthesis (molecular weight=250) manufactured by Merck, Germany. The commercially available undiluted polishing slurry solution used was BAIKALOX alumina slurry (Type KZ-50 (trade name)) manufactured by Baikowski Japan Co., Ltd. The respective contents of PVA, PEGDE and the undiluted polishing slurry solution in each of the polishing compositions of the Examples are shown in Table 1. The commercially available undiluted polishing slurry solution (trade name: KZ-50) is a product containing an alumina abrasive grain and a polishing accelerator.

Figure 4:
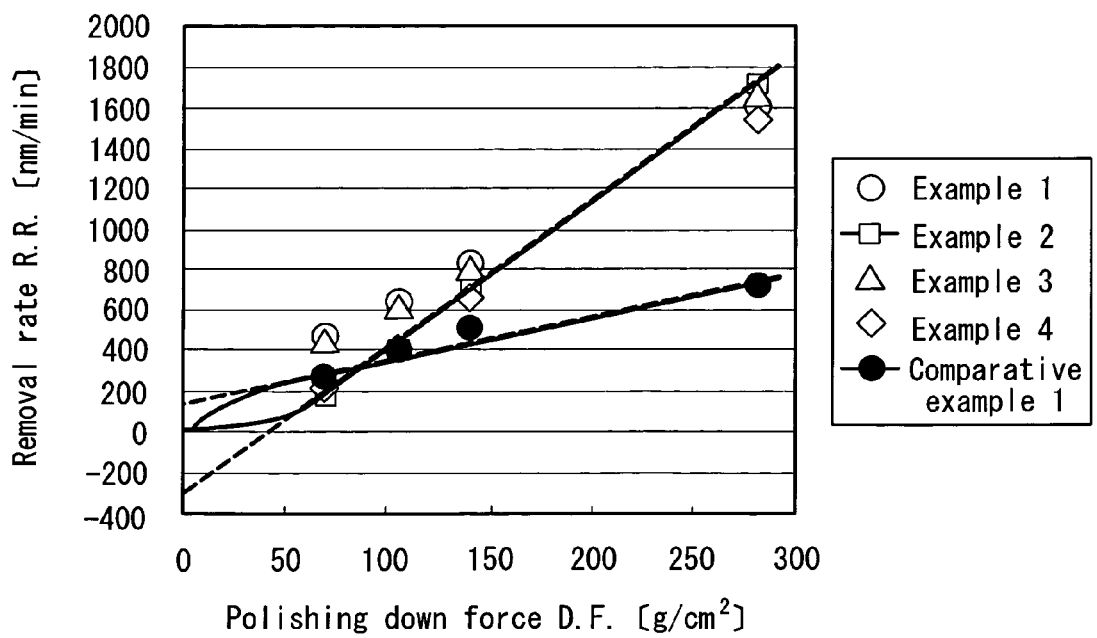
FIG. 4 is a graph showing the relationship between the polishing down force and the removal rate in each of Examples 1 to 4 and Comparative example 1.

Using each of the polishing compositions of the Examples, a laminate comprising an AlTiC wafer and an alumina film formed with a uniform thickness thereon was polished under the conditions described below. The thickness of the laminate before polishing and that after polishing were measured with an optical film thickness meter (trade name: NANOSPEC MODEL 9200; Nanometrix Japan Ltd.). The measurement results were used to determine the difference in thickness between before and after polishing, and the value of the difference was then used to determine the removal rate R.R. and its dependence on the polishing down force D.F. for each laminate. The results are shown in FIG. 4 and Table 1.

<Conditions for Polishing>

Polishing apparatus: Multiple single-wafer type CMP apparatus (ChaMP232C (trade name), Tokyo Seimitsu Co., Ltd.); Object to be polished: a laminate comprising an AlTiC wafer and an alumina film formed thereon (the alumina film is deposited to a thickness of 5,000 nm by sputtering on the 6-inch AlTiC wafer); Polishing pad: IC-1400 Pad D23" F9; XA01A2 (Nitta Haas Inc.); Polishing down force: 6.9 kPa, 10.4 kPa, 13.8 kPa, 27.5 kPa (70.3 g/cm$^2$, 105.5 g/cm$^2$, 140.6 g/cm$^2$, 281.2 g/cm$^2$); Linear velocity: 108 m/min; Polishing time: 60 sec.

Comparative Example 1

As in Examples 1 through 4, a polishing composition was prepared using the commercially available undiluted polishing slurry solution and water. The undiluted polishing slurry solution content of the polishing composition of Comparative example 1 is shown in Table 1. Using the polishing composition of Comparative example 1, a laminate the same as that used in each of Examples 1 through 4 was polished under the same polishing conditions as in Examples 1 through 4, and the removal rate R.R. and its dependence on the polishing down force D.F. were determined. The results are shown in FIG. 4 and Table 1. The two broken lines in FIG. 4 approximate the plotted data of Example 2 and Comparative example 1, respectively, in the entire range of polishing down force D.F. excluding the ranges closer to zero than the respective flexion points.

FIG. 4 indicates that, in the entire range of polishing down force D.F. excluding the ranges closer to zero than the flexion points, Examples 1 through 4 each show a greater increase in removal rate R.R. with respect to a given increase in polishing down force D.F. than Comparative example 1. If comparison is made between Example 2 and Comparative example 1, it can be seen that the broken line for Example 2 forms a smaller intercept on the axis of removal rate R.R. than does the broken line for Comparative example 1. This tendency holds true for the comparison of each of Examples 1, 3 and 4 with Comparative example 1. These results indicate that the polishing compositions of Examples 1 through 4, each containing the water-soluble polymer, each provide high step height reducing performance while achieving a higher removal rate R.R. than is achieved by the polishing composition of Comparative example 1 containing no water-soluble polymer.

Example 5

Figure 5:
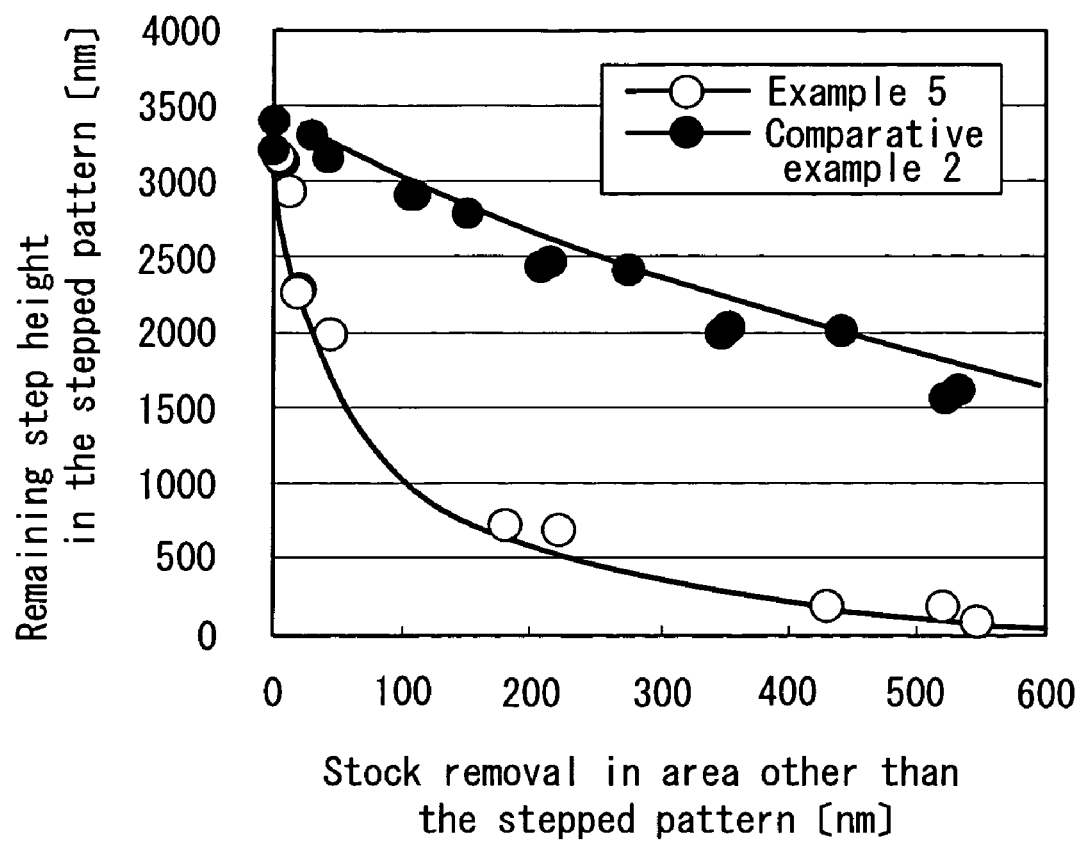
FIG. 5 is a graph showing the relationship between the stock removal and the remaining step height in each of Example 5 and Comparative example 2.

A polishing composition was prepared using the aforementioned polyethylene glycol dimethyl ether (PEGDE), the commercially available undiluted polishing slurry solution and water. The PEGDE content and the undiluted polishing slurry solution content of the polishing composition of Example 5 are shown in Table 1. This polishing composition was used to polish a laminate comprising an AlTiC wafer and an alumina film formed thereon, the alumina film having a 90 μm×150 μm stepped pattern with an initial step height of 3,300 nm formed over the entire surface thereof. The step height was measured with a stylus-type surface profiler (P-22, KLA-Tencor Corporation) and the thickness of the film excluding the stepped pattern was measured with the aforementioned optical film thickness meter. The step height reducing performance of the polishing process was monitored based on the measurements over time. The results are shown in FIG. 5.

<Conditions for Polishing>

Polishing apparatus: Multiple single-wafer type CMP apparatus (ChaMP232C (trade name), Tokyo Seimitsu Co., Ltd.); Object to be polished: a laminate comprising an AlTiC wafer and a stepped alumina film formed thereon (the alumina film is deposited to a thickness of 3,500 nm on the 6-inch AlTiC wafer and has a step having a height of 3,300 nm); Polishing pad: IC-1400 Pad D23" F9; XA01A2 (Nitta Haas Inc.); Polishing down force: 13.8 kPa (140.6 g/cm$^2$); Linear velocity: 108 m/min.

Comparative Example 2

A polishing composition was prepared using the aforementioned commercially available undiluted polishing slurry solution and water. The undiluted polishing slurry solution content of the polishing composition of Comparative example 2 is shown in Table 1. Using this composition, a laminate the same as that used in Example 5 was polished under the same polishing conditions as in Example 5, and the step height reducing performance was monitored over time. The results are shown in FIG. 5.

TABLE 1

| | Formulation of polishing composition (wt %) | | | Dependence of removal rate R.R. on polishing down force D.F. R.R.[nm/min] = a × D.F.[kPa] + b | |
|---|---|---|---|---|---|
| | Undiluted slurry solution | PVA | PEGDE | a | b |
| Example 1 | 10.0 | 0.001 | — | 55.6 | 77.7 |
| Example 2 | 10.0 | 0.010 | — | 75.4 | −361.1 |
| Example 3 | 10.0 | 0.100 | — | 59.2 | 15.5 |
| Example 4 | 10.0 | — | 0.050 | 64.6 | −241.4 |
| Example 5 | 25.0 | — | 0.100 | — | — |
| Comparative example 1 | 10.0 | — | — | 21.0 | 168.5 |
| Comparative example 2 | 25.0 | — | — | — | — |

In Table 1, the constant "a" corresponds to the constant K in the equation (3) and the constant "b" corresponds to the term (α−β) in the equation (3). Since the step height reducing performance in a CMP process is determined by the down-force difference between higher (projecting) areas and lower (recessed) areas of the surface, better step height reducing performance is obtained as the constant "a" is greater while the constant "b" is smaller. It can be seen from Table 1 that in each of Examples 1 through 4 the constant "a" is greater and the constant "b" is smaller than in Comparative example 1 that does not contain the protection-film-forming agent. Thus, in each of Examples 1 through 4, it was possible to perform polishing such that the constant "a" was kept within the range of 55.6 to 75.4 when the polishing down force D.F. was within the range of 6.9 kPa to 27.5 kPa. Furthermore, in Examples 2 and 4, in particular, the constant "b" is a negative value, which suggests that it is theoretically possible to design such a CMP process that only higher (projecting) areas undergo removal while lower (recessed) areas do not.

In Examples 1 through 3, the step height reducing performance does not increase with increasing PVA content. The reason is presumed to be that the presence of the protection-film-forming agent having a relatively large molecular weight (PVA: weight average molecular weight=22,000) in high proportion has caused, especially in Example 3, the aggregation of the alumina abrasive grain as well as the formation of the protection film. This suggests that an optimum range exists for the content of the protection-film-forming agent in the composition, and the range depends on its molecular weight. For example, when the water-soluble polymer has a weight average molecular weight within a range of 20,000 to 30,000, its content is preferably within a range of 0.001 to 0.01 wt %. When the water-soluble polymer has a weight average molecular weight within a range of 200 to 300, its content is preferably within a range of 0.050 to 0.1 wt %.

The results shown in FIG. 5 further demonstrate that in Example 5 the remaining step height became nearly zero with a smaller stock removal of alumina than in Comparative example 2. This indicates significantly improved step height reducing performance of Example 5 compared with Comparative example 2. According to the results, it was confirmed that the step height reducing efficiency in Example 5 was about 10 times higher than that in Comparative example 2. This is consistent with what was expected from the models discussed with reference to FIG. 2.

As described so far, the alumina-film-polishing composition of the present embodiment contains the protection-film-forming agent, and thus enables elimination of differences in level on the surface to be polished, with a minimum stock removal and without increasing the number of steps of the CMP process in which this composition is used. Thus, by using the alumina-film-polishing composition of the present embodiment, it is possible to planarize the surface of an alumina film efficiently while suppressing the stock removal variation, which is an important factor in manufacturing products.

The chemical mechanical polishing method of the present embodiment uses the alumina-film-polishing composition containing the protection-film-forming agent, and thus enables a great reduction in stock removal required for complete planarization. As a result, it becomes possible to suppress the stock removal variation of an alumina film in a wafer surface, and to thereby improve the polishing performance.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. An alumina-film-polishing composition for use in chemical mechanical polishing of an object to be polished, the object including an alumina film with an irregular surface, for planarizing the irregular surface, the composition containing:
   an alumina abrasive grain; and
   a protection-film-forming agent for forming a protection film on the surface of each of the alumina film and the alumina abrasive grain,
   the protection-film-forming agent being polyethylene glycol dimethyl ether that has a weight average molecular weight within a range of 200 to 300 and that is obtained by polymerizing a monomer having at least one OH group or COOH group in its molecule,
   wherein the alumina abrasive grain content is within a range of 0.1 to 30 wt %, and the polyethylene glycol dimethyl ether content is 0.050 to 0.1 wt %.

2. A concentrated alumina-film-polishing composition that contains less water compared with an alumina-film-polishing composition in actual use and that is to be diluted by adding water to form the alumina-film-polishing composition, the alumina-film-polishing composition being intended for use in chemical mechanical polishing of an object to be polished, the object including an alumina film with an irregular surface, for planarizing the irregular surface, the composition containing:
   an alumina abrasive grain; and
   a protection-film-forming agent for forming a protection film on the surface of each of the alumina film and the alumina abrasive grain,
   the protection-film-forming agent being polyethylene glycol dimethyl ether that has a weight average molecular weight within a range of 200 to 300 and that is obtained by polymerizing a monomer having at least one OH group or COOH group in its molecule,
   wherein the alumina abrasive grain content is within a range of 0.1 to 30 wt %, and the polyethylene glycol dimethyl ether content is 0.050 to 0.1 wt %.

3. A chemical mechanical polishing method for polishing an object to be polished, the object including an alumina film with an irregular surface, the method comprising:
   plarazing the irregular surface of the alumina film with an alumina-film-polishing composition as a polishing slurry, the alumina-film-polishing composition containing:
   an alumina abrasive grain; and
   a protection-film-forming agent for forming a protection film on the surface of each of the alumina film and the alumina abrasive grain,
   the protection-film-forming agent being polyethylene glycol dimethyl ether that has a weight average molecular weight within a range of 200 to 300 and that is obtained by polymerizing a monomer having at least one OH group or COOH group in its molecule,
   wherein the alumina abrasive grain content is within a range of 0.1 to 30 wt %, and the polyethylene glycol dimethyl ether content is 0.050 to 0.1 wt %.

* * * * *